(12) United States Patent
Kojima et al.

(10) Patent No.: US 10,281,002 B2
(45) Date of Patent: May 7, 2019

(54) DYNAMIC VIBRATION ABSORBING DEVICE AND FLUID COUPLING

(71) Applicant: EXEDY Corporation, Neyagawa-shi, Osaka (JP)

(72) Inventors: Yoshihiro Kojima, Neyagawa (JP); Kazushi Sone, Osaka (JP); Takumi Imada, Neyagawa (JP)

(73) Assignee: EXEDY CORPORATION, Neyagawa-Shi, Osaka (JP)

(*) Notice: Subject to any disclaimer, the term of this patent is extended or adjusted under 35 U.S.C. 154(b) by 0 days.

(21) Appl. No.: 15/558,093

(22) PCT Filed: Jan. 18, 2016

(86) PCT No.: PCT/JP2016/051253
§ 371 (c)(1),
(2) Date: Sep. 13, 2017

(87) PCT Pub. No.: WO2016/147690
PCT Pub. Date: Sep. 22, 2016

(65) Prior Publication Data
US 2018/0045269 A1 Feb. 15, 2018

(30) Foreign Application Priority Data

Mar. 19, 2015 (JP) ................. 2015-055836

(51) Int. Cl.
*F16F 15/14* (2006.01)
*F16H 39/42* (2006.01)
*F16H 45/02* (2006.01)

(52) U.S. Cl.
CPC ......... *F16F 15/1421* (2013.01); *F16H 39/42* (2013.01); *F16H 45/02* (2013.01); *F16H 2045/0226* (2013.01)

(58) Field of Classification Search
None
See application file for complete search history.

(56) References Cited

U.S. PATENT DOCUMENTS 2,664,763 A * 1/1954 Sarazin ................... F16F 15/14
74/574.3
6,109,134 A * 8/2000 Sudau ............... F16F 15/13157
192/207

(Continued)

FOREIGN PATENT DOCUMENTS

CN 101120186 A 2/2008
CN 104136801 A 11/2014

(Continued)

OTHER PUBLICATIONS

International Search Report dated Apr. 5, 2016 for corresponding foreign Application No. PCT/JP2016/051253, 2 pp.

(Continued)

*Primary Examiner* — Mark A Manley
(74) *Attorney, Agent, or Firm* — United IP Counselors, LLC

(57) ABSTRACT

A dynamic vibration absorbing device includes a guide member having an annular shape. The dynamic vibration absorbing device also includes at least one mass body that rolls along the guide member. In addition, the dynamic vibration absorbing device includes at least one elastic member non-rotatable relatively to the guide member, the at least one elastic member disposed to restrict the at least one mass body from rotating relatively to the guide member.

9 Claims, 4 Drawing Sheets

(56) References Cited

U.S. PATENT DOCUMENTS

| | | | |
|---|---|---|---|
| 8,708,116 B2* | 4/2014 | Miyahara | F16F 15/145 192/3.29 |
| 2002/0189569 A1* | 12/2002 | Jee | F16F 15/145 123/192.2 |
| 2004/0052200 A1* | 3/2004 | Liao | G11B 19/2009 720/702 |
| 2010/0096788 A1 | 4/2010 | Farahati et al. | |
| 2015/0000999 A1 | 1/2015 | Amano et al. | |
| 2015/0276014 A1 | 10/2015 | Aijima et al. | |
| 2015/0345565 A1 | 12/2015 | Tomiyama | |

FOREIGN PATENT DOCUMENTS

| | | |
|---|---|---|
| CN | 104781580 A | 7/2015 |
| DE | 335056 C | 4/1921 |
| DE | 112009002406 T5 | 1/2012 |
| DE | 112009005514 A5 | 10/2013 |
| EP | 2818753 A1 | 12/2014 |
| EP | 2916033 A1 | 9/2015 |
| JP | 2007-182986 A | 7/2007 |
| JP | 2012506006 A | 3/2012 |
| JP | 5555784 B1 | 7/2014 |
| KR | 1020140102300 A | 8/2014 |
| WO | 2010043301 A1 | 4/2010 |
| WO | 2013125050 A1 | 8/2013 |
| WO | 2014068750 A1 | 5/2014 |
| WO | 2014/119686 A1 | 8/2014 |

OTHER PUBLICATIONS

Notification of Reasons for Refusal of the corresponding Japanese patent application No. 2015-055836, dated Aug. 7, 2018, 6 pp.
First Office Action of the corresponding Chinese patent application No. 201680014043.2, dated Oct. 31, 2018, 7 pp.

* cited by examiner

DYNAMIC VIBRATION ABSORBING DEVICE AND FLUID COUPLING

CROSS-REFERENCES TO RELATED APPLICATIONS

This application is the U.S. National Phase of PCT International Application No. PCT/JP2016/051253, filed on Jan. 18, 2016. That application claims priority to Japanese Patent Application No. 2015-055836, filed Mar. 19, 2015. The contents of both of those applications are herein incorporated by reference in their entirety.

BACKGROUND

Technical Field

The present disclosure relates to a dynamic vibration absorbing device and a fluid coupling.

Background Art

A torque converter transmits a torque from an engine to a transmission. The torque converter includes a dynamic vibration absorbing device in order to inhibit fluctuations in rotational velocity of a rotary member composing the torque converter. For example, a dynamic vibration absorbing device, included in a torque converter described in Publication of Japan Patent No. 5555784, inhibits fluctuations in rotational velocity of a rotary member by an inertia ring rotated relatively to the rotary member.

SUMMARY

The inertia ring in the aforementioned dynamic vibration absorbing device is formed by hollowing out the middle part of a disc-shaped member. The hollowed-out middle part is unnecessary, and hence, a yield rate inevitably degrades in forming the dynamic vibration absorbing device.

It is an object of the present disclosure to provide a dynamic vibration absorbing device that the yield rate thereof can be enhanced.

Solution to Problems

A dynamic vibration absorbing device according to a first aspect of the present disclosure includes a guide member, at least one mass body and at least one elastic member. The guide member has an annular shape. The at least one mass body is configured to roll along the guide member. The at least one elastic member is non-rotatable relatively to the guide member. The at least one elastic member is disposed to restrict the at least one mass body from rotating relatively to the guide member.

When the dynamic vibration absorbing device according to the present disclosure is attached to a rotary member, fluctuations in rotational velocity of the rotary member can be inhibited. In other words, fluctuations in rotational velocity of the guide member can be attenuated by the at least one mass body and the at least one elastic member. Therefore, when the guide member is directly or indirectly attached to the rotary member, fluctuations in rotational velocity of the rotary member can be attenuated. Additionally, unlike a well-known inertia ring, the at least one mass body does not have a configuration obtained by hollowing out the middle part of a disc-shaped member. Hence, the yield rate can be herein enhanced. Additionally, the at least one mass body rolls along the guide member. Hence, a hysteresis torque to be generated when the at least one mass body is rotated relatively to the guide member can be made small in magnitude.

Preferably, the at least one mass body is a sphere.

Preferably, the dynamic vibration absorbing device further includes a coupling member. The guide member includes a plurality of guide parts that are coupled to each other by the coupling member. According to this configuration, the guide member can be easily formed.

Preferably, the at least one elastic member includes two elastic members. In other words, preferably, the dynamic vibration absorbing device includes two elastic members. One of the two elastic members is supported on one side of the coupling member in a circumferential direction. The other of the two elastic members is supported on the other side of the coupling member in the circumferential direction. According to this configuration, the coupling member can not only couple the guide parts but also support the respective elastic members.

Preferably, the dynamic vibration absorbing device further includes a plurality of elastic units. Each elastic unit includes the two elastic members and the coupling member. The plurality of elastic units are disposed at intervals in the circumferential direction. The at least one mass body is disposed between adjacent two of the plurality of elastic units.

Preferably, the coupling member includes a large diameter part, a first small diameter part and a second small diameter part. The large diameter part is disposed between adjacent two of the plurality of guide parts. The first small diameter part protrudes from one surface of the large diameter part and is fitted to one of the adjacent two of the plurality of guide parts. The second small diameter part protrudes from the other surface of the large diameter part and is fitted to the other of the adjacent two of the plurality of guide parts. According to this configuration, the respective guide parts can be easily coupled.

Preferably, the at least one mass body includes a plurality of mass bodies. In other words, preferably, the dynamic vibration absorbing device includes a plurality of mass bodies. According to this configuration, fluctuations in rotational velocity can be attenuated as appropriately as possible by adjusting the number of mass bodies.

Preferably, the dynamic vibration absorbing device further includes a support member. The support member is attached to a constituent member of a fluid coupling and supports the guide member.

A fluid coupling according to a second aspect of the present disclosure includes a front cover, an impeller, a turbine, a lock-up device, an output hub and the dynamic vibration absorbing device. The front cover is a constituent element to which a torque is inputted. The impeller is fixed to the front cover. The turbine is opposed to the impeller. The lock-up device is disposed between the front cover and the turbine. The output hub outputs the torque. The dynamic vibration absorbing device has any of the aforementioned configurations of the dynamic vibration absorbing device, and is attached to any of the turbine, the lock-up device and the output hub.

The dynamic vibration absorbing device according to the present disclosure can enhance the yield rate thereof.

DETAILED DESCRIPTION OF EMBODIMENTS

An exemplary embodiment of a dynamic vibration absorbing device according to the present disclosure and a torque converter (an exemplary fluid coupling) using the same will be hereinafter explained with reference to drawings. It should be noted that the term "axial direction" means an extending direction of a rotational axis of the dynamic vibration absorbing device, whereas the term "circumferential direction" means a circumferential direction of an imaginary circle about the rotational axis of the dynamic vibration absorbing device. On the other hand, the term "radial direction" means a radial direction of the imaginary circle about the rotational axis of the dynamic vibration absorbing device. It should be noted that in the present exemplary embodiment, the rotational axis of the dynamic vibration absorbing device and a rotational axis O of the torque converter are substantially the same.

Figure 1:
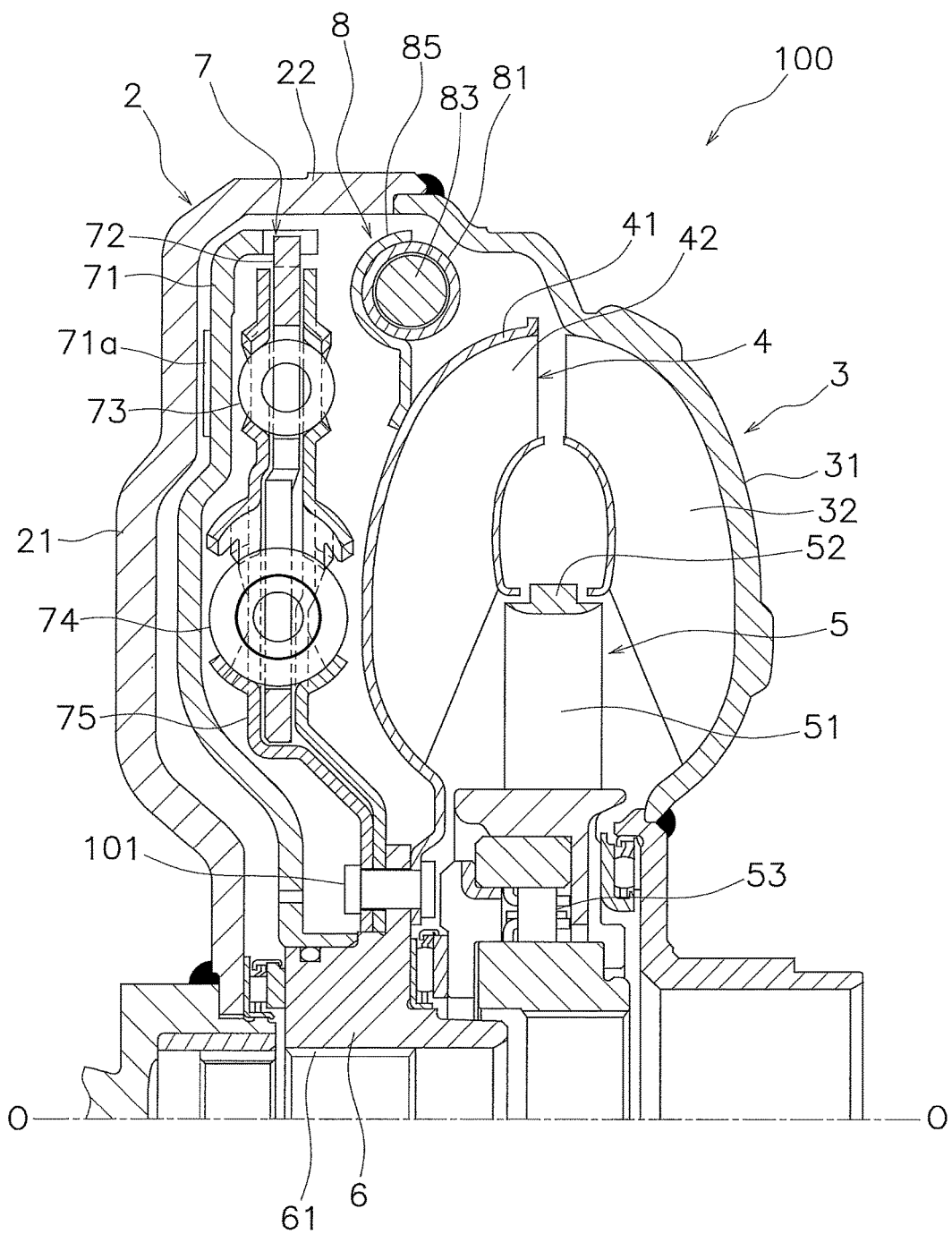
FIG. 1 is a cross-sectional view of a torque converter.

As shown in FIG. 1, a torque converter 100 includes a front cover 2, an impeller 3, a turbine 4, a stator 5, an output hub 6, a lock-up device 7 and a dynamic vibration absorbing device 8. It should be noted that although an engine and a transmission are not shown in FIG. 1, the engine is disposed on the left side of the torque converter 100 whereas the transmission is disposed on the right side of the torque converter 100.

The front cover 2 is a member that a torque from the engine is inputted thereto. Detailedly, the front cover 2 includes a disc part 21 and a circumferential wall part 22. The circumferential wall part 22 extends from the outer peripheral end of the disc part 21 toward the transmission.

The impeller 3 is fixed to the front cover 2. The impeller 3 includes an impeller shell 31 and a plurality of impeller blades 32. The impeller shell 31 is fixed to the front cover 2. Detailedly, the impeller shell 31 is welded to the front cover 2. The impeller blades 32 are attached to the impeller shell 31.

The turbine 4 is disposed in axial opposition to the impeller 3. The turbine 4 includes a turbine shell 41 and a plurality of turbine blades 42. The turbine blades 42 are attached to the turbine shell 41.

The stator 5 is a mechanism disposed between the impeller 3 and the turbine 4 so as to regulate the flow of hydraulic oil returning from the turbine 4 to the impeller 3. The stator 5 includes a stator carrier 51 and a stator blade 52. The stator carrier 51 is supported by a stationary shaft (not shown in the drawings) through a one-way clutch 53. The stator blade 52 is attached to the outer peripheral surface of the stator carrier 51.

The output hub 6 outputs a torque toward the transmission through an output shaft (not shown in the drawings). The output hub 6 is unitarily rotated with the turbine 4. Detailedly, the turbine 4 is fixed to the output hub 6 by a plurality of rivets 101. The output hub 6 includes a hole 61. The output shaft (not shown in the drawings) is fitted to the hole 61 of the output hub 6. Detailedly, the output shaft is spline-coupled to the hole 61 of the output hub 6.

The lock-up device 7 is disposed between the front cover 2 and the turbine 4. The lock-up device 7 is configured to allow or block transmission of the torque from the front cover 2 to the output hub 6. The lock-up device 7 includes a piston plate 71, an input plate 72, at least one outer peripheral side torsion spring 73, at least one inner peripheral side torsion spring 74 and an output plate 75.

The piston plate 71 is slidable on the output hub 6 in the axial direction. The piston plate 71 is engaged by friction with the front cover 2 through a friction member 71a provided on the outer peripheral part of the piston plate 71.

The torque, transmitted from the front cover 2 to the piston plate 71, is transmitted to the input plate 72, and is then transmitted to the output plate 75 through the at least one outer peripheral side torsion spring 73 and the at least one inner peripheral side torsion spring 74. The output plate 75 is unitarily rotated with the output hub 6.

The dynamic vibration absorbing device 8 is a device for attenuating fluctuations in rotational velocity. The dynamic vibration absorbing device 8 is attached to, for instance, the turbine 4. Specifically, the dynamic vibration absorbing device 8 is attached to the turbine shell 41. It should be noted that the dynamic vibration absorbing device 8 may be attached, not to the turbine 4, but to another member. For example, the dynamic vibration absorbing device 8 may be attached to any of the constituent members of the lock-up device 7, or alternatively may be attached to the output hub 6.

Figure 2:
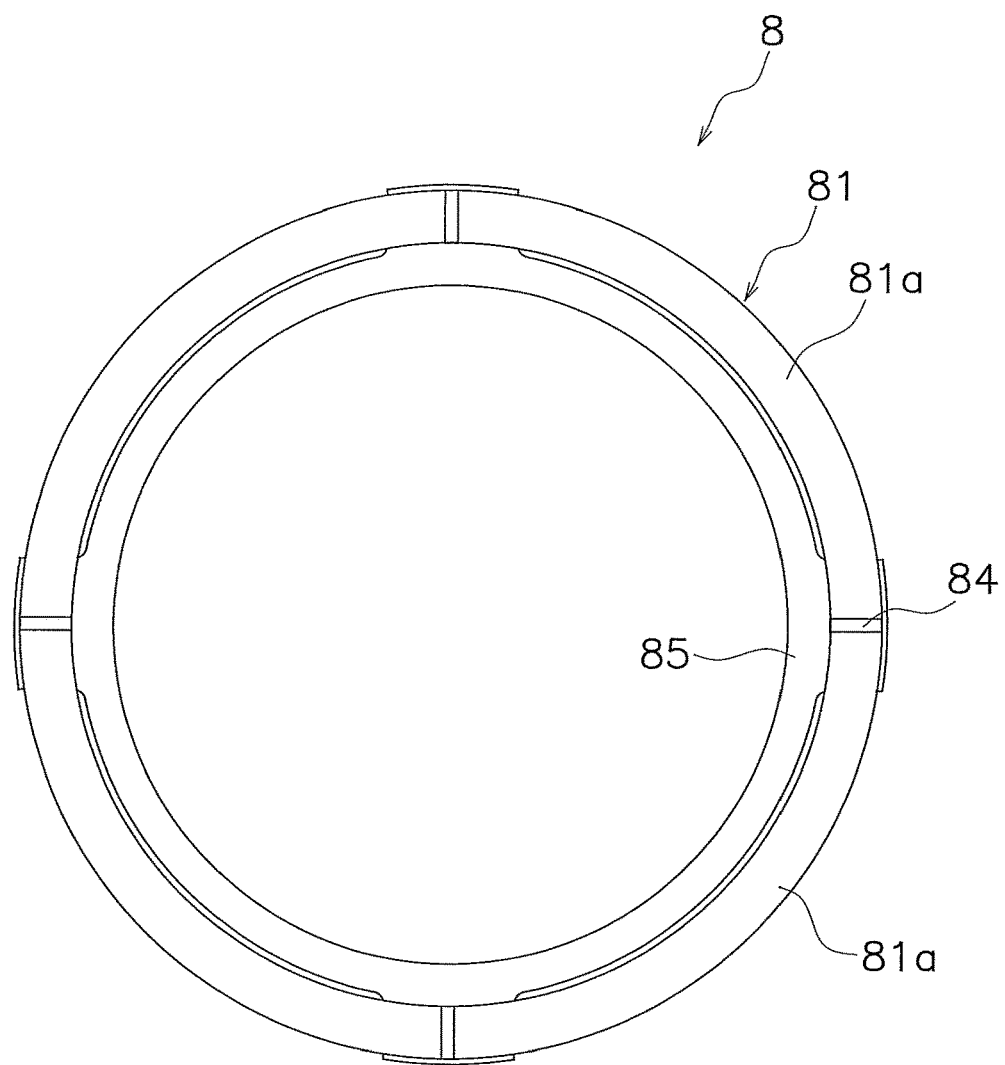
FIG. 2 is a front view of a dynamic vibration absorbing device.
Figure 3:
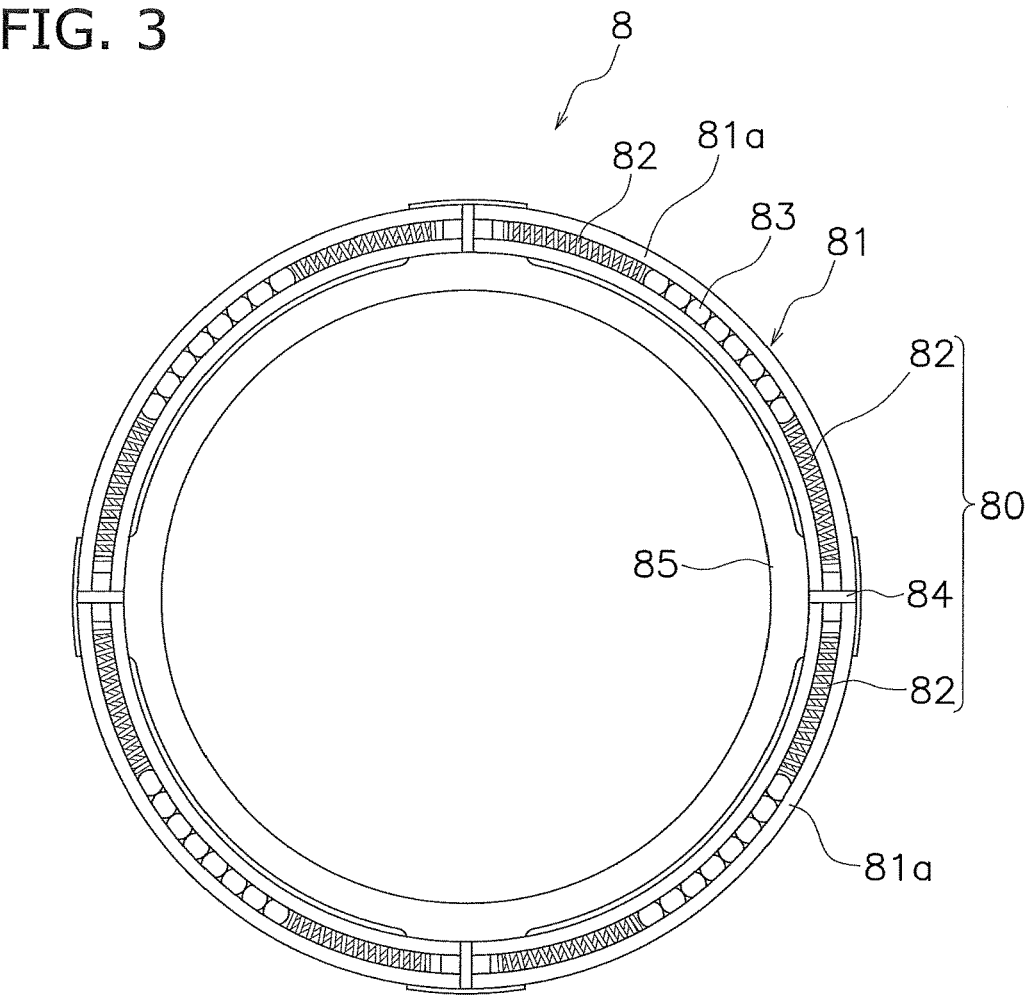
FIG. 3 is a front view of the dynamic vibration absorbing device and shows the interior of a guide member.

FIG. 2 is a front view of the dynamic vibration absorbing device 8 as seen from the engine side, whereas FIG. 3 is a front view of the dynamic vibration absorbing device 8 in a condition that a slit is formed in a guide member 81 so as to make the interior of the guide member 81 visible. It should be noted that the slit is not actually formed in the guide member 81.

As shown in FIGS. 2 and 3, the dynamic vibration absorbing device 8 includes the guide member 81, a plurality of elastic members 82 and a plurality of mass bodies 83. Additionally, the dynamic vibration absorbing device 8 further includes a plurality of coupling members 84 and a support member 85.

The guide member 81 has an annular shape. Additionally, the guide member 81 is a tubular member and includes a space in the interior thereof. In other words, the guide member 81 is obtained by annularly forming the tubular member. The respective elastic members 82 and the respective mass bodies 83 are disposed in the space of the guide member 81.

The guide member 81 includes a plurality of guide parts 81a. For example, the guide member 81 in the present exemplary embodiment includes four guide parts 81a. Each guide part 81a is a tubular member. Additionally, each guide part 81a is made in the shape of a circular arc about the rotational axis 0. The annular guide member 81 is formed by joining the respective circular-arc guide parts 81a to each other. Adjacent two of the guide parts 81a are coupled through one of the coupling members 84. The guide member 81 is preferably made of steel material, and is more preferably made of stainless steel material or carbon steel material for machine structural use. More specifically, the guide member 81 is made of SUS304, STKM13A or so forth.

Figure 4:
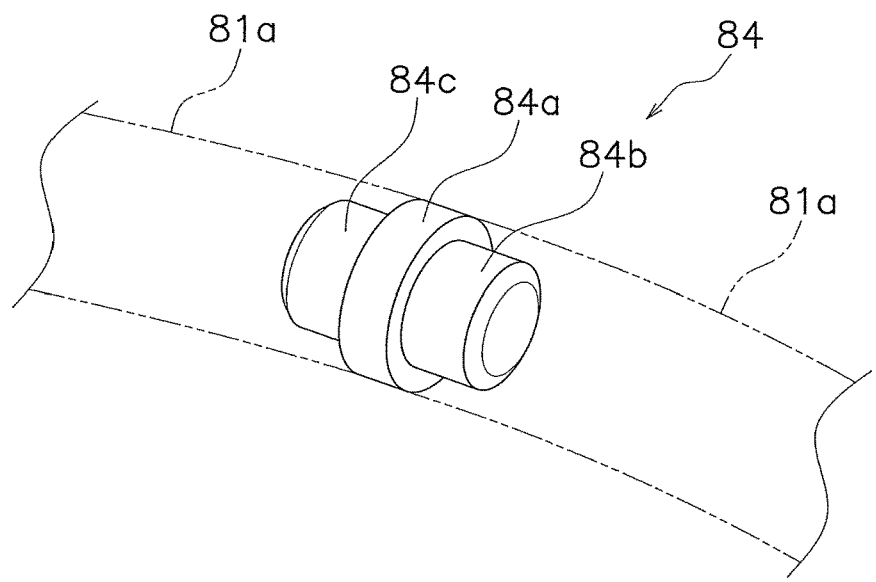
FIG. 4 is a perspective view of a coupling member.

Each coupling member 84 is a member for coupling adjacent two of the guide parts 81a. As shown in FIG. 4, each coupling member 84 includes a large diameter part 84a, a first small diameter part 84b and a second small diameter part 84c. The large diameter part 84a is disposed between adjacent two of the guide parts 81a. The large diameter part 84a is interposed between adjacent two of the guide parts 81a. Detailedly, the outer diameter of the large diameter part 84a is greater than the inner diameter of each guide part 81a. Therefore, the large diameter part 84a cannot be disposed in the interior of each guide part 81a. it should be noted that preferably, the outer diameter of the large diameter part 84*a* is roughly equal to that of each guide part 81*a*.

The first small diameter part 84*b* protrudes from one surface of the large diameter part 84*a* into one of the adjacent two guide parts 81*a*. In other words, the first small diameter part 84*b* is disposed inside the one of the adjacent two guide parts 81*a*. It should be noted that the first small diameter part 84*b* is fitted to the one of the adjacent two guide parts 81*a*. Specifically, the first small diameter part 84*b* can be fitted to the guide part 81*a* by setting the outer diameter of the first small diameter part 84*b* to be approximately equal to the inner diameter of the guide part 81*a*.

The second small diameter part 84*c* protrudes from the other surface of the large diameter part 84*a* into the other of the adjacent two guide parts 81*a*. In other words, the second small diameter part 84*c* protrudes oppositely to the first small diameter part 84*b*. The second small diameter part 84*c* is disposed inside the other of the adjacent two guide parts 81*a*. It should be noted that the second small diameter part 84*c* is fitted to the other of the adjacent two guide parts 81*a*. Specifically, the second small diameter part 84*c* can be fitted to the guide part 81*a* by setting the outer diameter of the second small diameter part 84*c* to be approximately equal to the inner diameter of the guide part 81*a*. Thus, the first small diameter part 84*b* is fitted to one of the adjacent two guide parts 81*a* whereas the second small diameter part 84*c* is fitted to the other of the adjacent two guide parts 81*a*, whereby two guide parts 81*a* are coupled through one coupling member 84.

As shown in FIG. 3, the respective elastic members 82 are non-rotatable relatively to the guide member 81. In other words, the respective elastic members 82 are unitarily rotated with the guide member 81. The respective elastic members 82 are disposed inside the guide member 81. It should be noted that in the present exemplary embodiment, eight elastic members 82 are disposed inside the guide member 81. It should be noted that the respective elastic members 82 are contracted and expanded inside the guide member 81.

The respective elastic members 82 restrict rotation of the respective mass bodies 83 relative to the guide member 81. Detailedly, the respective elastic members 82 restrict movement of the respective mass bodies 83 relative to the guide member 81 in the circumferential direction. In other words, rotation of each mass body 83 relative to the guide member 81 is restricted so as to be allowed only by the amount of contraction and expansion of each elastic member 82. It should be noted that the term "relative rotation" means relative rotation about the rotational axis 0. The respective elastic members 82 are, for instance, coil springs. The respective elastic members 82 extend inside the guide member 81 in the circumferential direction. For example, the respective elastic members 82 are disposed inside the guide member 81 while being compressed.

The respective elastic members 82 are installed at intervals in the circumferential direction. Detailedly, one coupling member 84 is disposed between two elastic members 82. Additionally, one of the elastic members 82 is supported on one side of the coupling member 84 in the circumferential direction, whereas the other of the elastic members 82 is supported on the other side of the coupling member 84 in the circumferential direction. Detailedly, one of the elastic members 82 makes contact with the first small diameter part 84*b*, whereas the other of the elastic members 82 makes contact with the second small diameter part 84*c*. With the coupling members 84, the respective elastic members 82 are configured to be non-rotatable relatively to the guide member 81. A plurality of elastic units 80, each of which includes two elastic members 82 and one coupling member 84, are disposed at intervals in the circumferential direction. It should be noted that in the present exemplary embodiment, four elastic units 80 are disposed at intervals.

The respective mass bodies 83 are disposed inside the guide member 81. The respective mass bodies 83 are configured to roll along the guide member 81. Detailedly, the respective mass bodies 83 are configured to roll inside the guide member 81. Each mass body 83 is specifically a sphere, and is more specifically a steel ball. The respective mass bodies 83 are rotated relatively to the guide member 81 by rolling along the guide member 81. In other words, the respective mass bodies 83 are moved relatively to the guide member 81 in the circumferential direction by rolling along the guide member 81. Thus, each mass body 83 is rotatable and is also revolvable about the rotational axis O. It should be noted that as described above, the respective mass bodies 83 are restricted from rotating relatively to the guide member 81 by the respective elastic members 82. Therefore, rotation of each mass body 83 relative to the guide member 81 is allowed only by the amount of contraction and expansion of each elastic member 82. It should be noted that when rotated relatively to the guide member 81, the respective mass bodies 83 are not necessarily always rotated along the guide member 81. For instance, the respective mass bodies 83 may be occasionally slid against the guide member 81.

The respective mass bodies 83 are disposed among the elastic members 82. Detailedly, the mass bodies 83 are disposed adjacent two of the elastic units 80. More detailedly, the mass bodies 83 are disposed between the elastic member 82 making contact with the first small diameter part 84*b* in one of the adjacent two elastic units 80 and the elastic member 82 making contact with the second small diameter part 84*c* in the other of the adjacent two elastic units 80. In other words, the coupling member 84, the elastic member 82, the mass bodies 83 and the elastic member 82 are disposed in this order in the circumferential direction. Preferably, the respective mass bodies 83 are disposed without any gap among the elastic members 82. In other words, each of the mass bodies 83 at least makes contact with one of the mass bodies 83 or one of the elastic members 82.

As shown in FIG. 1, the support member 85 is attached to a constituent member of the torque converter 100. Specifically, the support member 85 is attached to the turbine shell 41. The support member 85 supports the guide member 81. The support member 85 has an approximately annular shape and is attached at the inner peripheral end thereof to the turbine shell 41.

Figure 5:
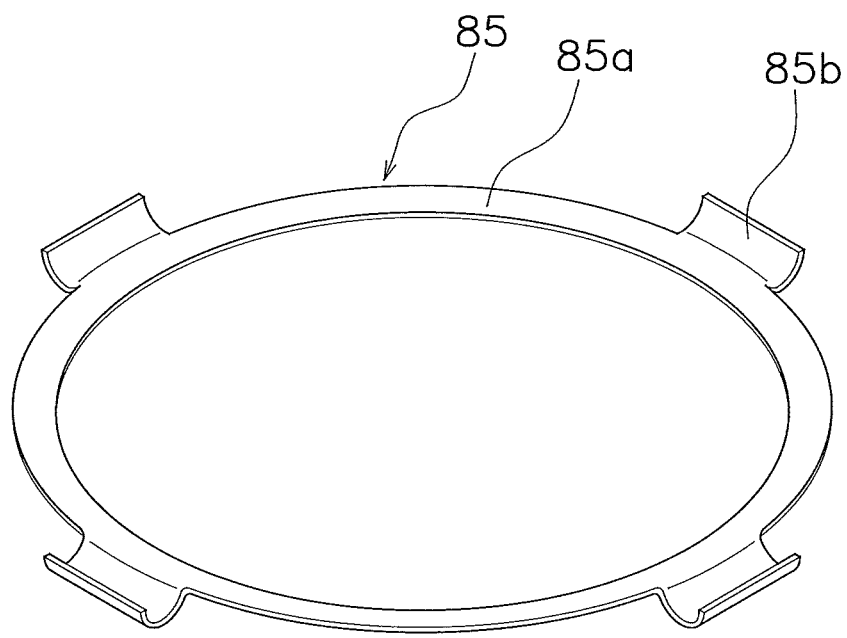
FIG. 5 is a perspective view of a support member.

As shown in FIG. 5, the support member 85 includes a body 85*a* and a plurality of support parts 85*b*. The body 85*a* has an annular shape and is attached at the inner peripheral end thereof to the turbine shell 41. For example, the body 85*a* is attached to the turbine shell 41 by welding or so forth.

The respective support parts 85*b* protrude radially outside from the outer peripheral end of the body 85*a*. The respective support parts 85*b* are disposed at intervals in the circumferential direction. Preferably, the respective support parts 85*b* are disposed at equal intervals. One surface of each support part 85*b* is shaped along the shape of the guide member 81. The one surface of each support part 85*b* and the guide member 81 are bonded.

According to the dynamic vibration absorbing device 8 explained above, fluctuations in rotational velocity of the turbine 4 can be attenuated. In other words, fluctuations in rotational velocity of the guide member 81, and further, fluctuations in rotational velocity of the turbine 4 can be attenuated by the respective mass bodies 83 and the respective elastic members 82. Additionally, unlike a well-known inertia ring, each mass body 83 does not have a configuration obtained by hollowing out the middle part of a disc-shaped member. Hence, the yield rate can be herein enhanced. Additionally, the mass bodies 83 roll along the guide member 81. Hence, a hysteresis torque to be generated when the respective mass bodies 83 are rotated relatively to the guide member 81 can be made small in magnitude.

[Modifications]

The exemplary embodiment of the present disclosure has been described above. However, the present disclosure is not limited to this, and a variety of changes can be made without departing from the scope of the present disclosure.

Modification 1

In the aforementioned exemplary embodiment, the guide member 81 is attached to the turbine shell 41 through the support member 85. However, the guide member 81 may be directly attached to the turbine shell 41 without using the support member 85.

Modification 2

In the aforementioned exemplary embodiment, each mass body 83 is a sphere, but the shape of each mass body 83 is not particularly limited to this. Each mass body 83 may have an arbitrary shape as long us it rolls along the guide member 81. For example, each mass body 83 may have a columnar shape.

Modification 3

In the aforementioned exemplary embodiment, the guide member 81 has a tubular shape, but the shape of the guide member 81 is not particularly limited to this. The guide member 81 may have an arbitrary shape as long as it can guide the respective mass bodies 83 so as to make them roll in the circumferential direction. For example, the guide member 81 can be constructed to include an outer peripheral wall part and an inner peripheral wall part. The outer peripheral wall part is disposed radially outside the respective mass bodies 83, whereas the inner peripheral wall part is disposed radially inside the respective mass bodies 83.

REFERENCE SIGNS LIST

2 Front cover
3 Impeller
4 Turbine
6 Output hub
7 Lock-up device
8 Dynamic vibration absorbing device
81 Guide member
81a Guide part
82 Elastic member
83 Mass body
84 Coupling member
84a Large diameter part
84b First small diameter part
84c Second small diameter part
85 Support member
100 Torque converter

The invention claimed is:

1. A dynamic vibration absorbing device comprising:
   a guide member having an annular shape, the guide member having a plurality of tubular, circular-arc individual guide parts joined end-to-end in a circumferential direction to form the annular shape;
   at least one mass body configured to roll along the guide member; and
   at least one elastic member non-rotatable relative to the guide member, the at least one elastic member disposed to restrict the at least one mass body from rotating relative to the guide member.

2. The dynamic vibration absorbing device according to claim 1, wherein the at least one mass body is a sphere.

3. The dynamic vibration absorbing device according to claim 1, further comprising:
   one or more coupling members, the plurality of guide parts joined to each other by the one or more coupling members.

4. The dynamic vibration absorbing device according to claim 3, wherein
   the at least one elastic member includes two elastic members,
   one of the two elastic members is supported on one side of the coupling member in the circumferential direction, and
   the other of the two elastic members is supported on the other side of the coupling member in the circumferential direction.

5. The dynamic vibration absorbing device according to claim 4, further comprising:
   a plurality of elastic units each including the two elastic members and the one or more coupling members, wherein
   the plurality of elastic units are disposed at intervals in the circumferential direction, and
   the at least one mass body is disposed between an adjacent two of the plurality of elastic units.

6. The dynamic vibration absorbing device according to claim 3, wherein each of the one or more coupling members includes a large diameter part, a first small diameter part and a second small diameter part, the large diameter part disposed between an adjacent two of the plurality of guide parts, the first small diameter part protruding from one surface of the large diameter part, the first small diameter part fitted to one of the adjacent two of the plurality of guide parts, the second small diameter part protruding from the other surface of the large diameter part, the second small diameter part fitted to the other of the adjacent two of the plurality of guide parts.

7. The dynamic vibration absorbing device according to claim 1, wherein the at least one mass body includes a plurality of mass bodies.

8. The dynamic vibration absorbing device according to claim 1, further comprising:
   a support member attached to a constituent member of a fluid coupling, the support member supporting the guide member.

9. A fluid coupling comprising:
   a front cover to which a torque is inputted;
   an impeller fixed to the front cover;
   a turbine opposed to the impeller;
   a lock-up device disposed between the front cover and the turbine;
   an output hub for outputting the torque; and
   the dynamic vibration absorbing device recited in claim 1, the dynamic vibration absorbing device attached to any of the turbine, the lock-up device or the output hub.

* * * * *